United States Patent
Lee et al.

(10) Patent No.: US 8,304,104 B2
(45) Date of Patent: **\*Nov. 6, 2012**

(54) BATTERY MODULE HAVING HEAT DISSIPATION MEMBER OF NOVEL STRUCTURE AND BATTERY PACK EMPLOYED WITH THE SAME

(75) Inventors: Jinkyu Lee, Busan (KR); Hee Soo Yoon, Daejeon (KR); BumHyun Lee, Seoul (KR); Dal Mo Kang, Daejeon (KR); Minjung Kim, Suwon-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/275,012

(22) Filed: Oct. 17, 2011

(65) Prior Publication Data

US 2012/0094166 A1  Apr. 19, 2012

Related U.S. Application Data

(63) Continuation of application No. PCT/KR2010/006254, filed on Sep. 14, 2010.

(30) Foreign Application Priority Data

Sep. 17, 2009 (KR) .......................... 10-2009-0088256

(51) Int. Cl.
*H01M 10/50* (2006.01)
*H01M 2/10* (2006.01)

(52) U.S. Cl. ........................................ 429/120
(58) Field of Classification Search .................... 429/120
See application file for complete search history.

(56) References Cited

U.S. PATENT DOCUMENTS

| 2006/0216582 | A1 | 9/2006 | Lee et al. | |
|---|---|---|---|---|
| 2010/0330408 | A1 | 12/2010 | Yoon et al. | |
| 2011/0059347 | A1* | 3/2011 | Lee et al. | 429/120 |
| 2011/0070474 | A1* | 3/2011 | Lee et al. | 429/120 |
| 2011/0223457 | A1* | 9/2011 | Lee et al. | 429/99 |

FOREIGN PATENT DOCUMENTS

| JP | 4164212 B2 | 10/2008 |
|---|---|---|
| JP | 2009-176464 A | 8/2009 |
| KR | 10-0648698 B1 | 11/2006 |
| KR | 10-2009-0047927 A | 5/2009 |

OTHER PUBLICATIONS

International Search Report, dated May 23, 2011 in PCT/KR2010/006254.

* cited by examiner

*Primary Examiner* — Gregg Cantelmo
(74) *Attorney, Agent, or Firm* — Birch, Stewart, Kolasch & Birch, LLP

(57) ABSTRACT

Disclosed is a battery module including a plurality of plate-shaped battery cells mounted in a module case in a stacked state, wherein each of the plate-shaped battery cells is configured in a structure in which an electrode assembly is mounted in a battery case formed of a laminate sheet, the battery module is configured in a structure in which a plurality of heat dissipation members disposed at two or more interfaces between the battery cells and a heat exchange member to integrally interconnect the heat dissipation members are mounted at one side of a battery cell stack, and heat generated from the battery cells during charge and discharge of the battery cells is removed by the heat exchange member via the heat dissipation members.

22 Claims, 9 Drawing Sheets

BATTERY MODULE HAVING HEAT DISSIPATION MEMBER OF NOVEL STRUCTURE AND BATTERY PACK EMPLOYED WITH THE SAME

This application is a Continuation of PCT International Application No. PCT/KR2010/006254 filed on Sep. 14, 2010, which claims priority under 35 U.S.C. §119(a) to Patent Application No. 10-2009-0088256 filed in the Republic of Korea on Sep. 17, 2009, all which are hereby incorporated by reference into the present application.

TECHNICAL FIELD

The present invention relates to a battery module having a heat dissipation member of a novel structure and a middle or large-sized battery pack including the same, and, more particularly, to a battery module including a plurality of plate-shaped battery cells mounted in a module case in a stacked state, wherein the battery module is configured in a structure in which a plurality of heat dissipation members disposed at two or more interfaces between the battery cells and a heat exchange member to integrally interconnect the heat dissipation members are mounted at one side of a battery cell stack, and heat generated from the battery cells during charge and discharge of the battery cells is removed by the heat exchange member, and each of the heat dissipation members includes a main body part, a connection part and a top part.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to one another because high power and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell (unit cell) of the middle or large-sized battery module. In particular, much interest is currently focused on the pouch-shaped battery, which uses an aluminum laminate sheet as a sheathing member, because the pouch-shaped battery is lightweight, the manufacturing costs of the pouch-shaped battery are low, and it is easy to modify the shape of the pouch-shaped battery.

Battery cells constituting such a middle or large-sized battery module are secondary batteries which can be charged and discharged. Consequently, a large amount of heat is generated from the high-power, large-capacity secondary batteries during the charge and discharge of the batteries. In particular, the laminate sheet of each pouch-shaped battery widely used in the battery module has a polymer material exhibiting low thermal conductivity coated on the surface thereof with the result that it is difficult to effectively lower the overall temperature of the battery cells.

That is, if the heat, generated from the battery module during the charge and discharge of the battery module, is not effectively removed from the battery module, the heat accumulates in the battery module with the result that deterioration of the battery module is accelerated. According to circumstances, the battery module may catch fire or explode. For this reason, a cooling system is needed in a battery pack for vehicles, which is a high-power, large-capacity battery, to cool battery cells mounted in the battery pack.

Each battery module mounted in a middle or large-sized battery pack is generally manufactured by stacking a plurality of battery cells with high integration. In this case, the battery cells are stacked in a state in which the battery cells are arranged at predetermined intervals so that heat generated during the charge and discharge of the battery cells is removed. For example, the battery cells may be sequentially stacked in a state in which the battery cells are arranged at predetermined intervals without using an additional member. Alternatively, in a case in which the battery cells have low mechanical strength, one or more battery cells are mounted in a battery cartridge, and a plurality of battery cartridges is stacked to constitute a battery module. Coolant channels may be defined between the stacked battery cells or between the stacked battery modules so that heat accumulating between the stacked battery cells or between the stacked battery modules is effectively removed.

In this structure, however, it is necessary to provide a plurality of coolant channels corresponding to the number of the battery cells with the result that the overall size of the battery module is increased.

Also, in a case in which a plurality of battery cells is stacked, the intervals of the coolant channels are relatively narrowed in consideration of the size of the battery module. As a result, design of the cooling structure is complicated. That is, high pressure loss is caused by the coolant channels arranged at intervals narrower than a coolant inlet port with the result that it is difficult to design shapes and positions of the coolant inlet port and a coolant outlet port. Also, a fan may be further provided to prevent such pressure loss, and therefore, design may be restricted due to power consumption, fan noise, space or the like.

Furthermore, desired cooling efficiency may not be achieved due to the same thickness of members used in designing the cooling structure or spaces defined between the members.

Consequently, there is a high necessity for a battery module which provides high power and large capacity, which can be manufactured in a simple and compact structure, and which exhibits excellent life span and safety.

DISCLOSURE

Technical Problem

Therefore, the present invention has been made to solve the above problems, and other technical problems that have yet to be resolved.

Specifically, it is an object of the present invention to provide a battery module configured in a structure in which coolant channels are minimally formed, and high thermal conductivity is achieved by a specific structure of heat dissipation members, thereby achieving uniform temperature of the battery module while restricting the increase in size of the battery module and thus reducing temperature deviation.

Technical Solution

In accordance with one aspect of the present invention, the above and other objects can be accomplished by the provision of a battery module including a plurality of plate-shaped battery cells mounted in a module case in a stacked state, wherein each of the plate-shaped battery cells is configured in a structure in which an electrode assembly is mounted in a battery case formed of a laminate sheet, the battery module is configured in a structure in which a plurality of heat dissipation members disposed at two or more interfaces between the battery cells and a heat exchange member to integrally interconnect the heat dissipation members are mounted at one side of a battery cell stack, and heat generated from the battery cells during charge and discharge of the battery cells is removed by the heat exchange member via the heat dissipation members, and each of the heat dissipation members includes a main body part disposed at the interface between the corresponding battery cells, a connection part connected to the main body part in a state in which the connection part is exposed outward from the stacked battery cells, and a top part perpendicularly extending from the connection part in opposite directions so that the top part contacts the heat exchange member, the connection part having a greater thickness than the main body part.

Generally, a battery module is configured in a structure in which battery cells are stacked while being arranged at predetermined intervals to form coolant channels so that air flows (in an air cooling type) in the spaces defined between the respective battery cells to prevent overheating of the battery cells. However, this type of battery module does not provide a sufficient heat dissipation effect.

In the battery module according to the present invention, on the other hand, a plurality of heat dissipation members is disposed at two or more interfaces between the battery cells, and a heat exchange member to integrally interconnect the heat dissipation members is mounted at one side of a battery cell stack. Consequently, it is possible to cool the battery cell stack with higher cooling efficiency than a conventional cooling system without the provision of spaces between the respective battery cells or although small spaces are provided between the respective battery cells, and therefore, it is possible to maximize heat dissipation efficiency of the battery module and to stack the battery cells with high integration.

Also, in the battery module according to the present invention, the connection part of each of the heat dissipation members has a greater thickness than the main body part of each of the heat dissipation members so as to improve thermal conductivity from the battery cells to the heat exchange member. Consequently, heat generated from the battery cells is transferred to the heat exchange member through thermal conduction achieved by coupling between the heat dissipation members, which are specifically designed, and the heat exchange member, and therefore, it is possible to effectively remove the heat generated from the battery cells.

The material for each of the heat dissipation members is not particularly restricted so long as each of the heat dissipation members is formed of a thermally conductive material. For example, each of the heat dissipation members may be formed of a metal sheet exhibiting high thermal conductivity. The heat dissipation members may be disposed at all of the interfaces between the battery cells or at some of the interfaces between the battery cells. For example, in a case in which the heat dissipation members are disposed at all of the interfaces between the battery cells, the respective battery cells may be in contact with different heat dissipation members at opposite sides thereof. On the other hand, in a case in which the heat dissipation members are disposed at some of the interfaces between the battery cells, some of the battery cells may be in contact with the heat dissipation members only at one side thereof.

The material for the heat exchange member is not particularly restricted so long as the heat exchange member is formed of a material exhibiting high thermal conductivity. Preferably, the heat exchange member is formed of a metal material exhibiting higher thermal conductivity and mechanical strength than other materials. The heat dissipation members and the heat exchange member may be connected to each other to achieve effective heat transfer.

The heat dissipation efficiency of each of the heat dissipation members is influenced by the surface area of each of the heat dissipation members. Here, the surface area of each of the heat dissipation members means the sum of areas of the main body part, the connection part and the top part. In this aspect, the main body part of each of the heat dissipation members disposed at the interfaces between the respective battery cells may have a size equivalent to 70 to 120% of the area of one major surface of each of the battery cells.

If the size of the main body part is too small, it is difficult to easily transfer heat generated from the battery cells. If the size of the main body part is too large, on the other hand, the overall size of the battery module is increased, which is not preferable.

Also, the surface area of each of the heat dissipation members is influenced by the thickness of the connection part and the width of the top part.

The inventors of the present application have been found through various experiments that in the battery module having the structure according to the present invention, the connection part, which connects the main body part of each of the heat dissipation members to the heat exchange member via the module case, acts as a bottleneck section in heat transfer, and therefore, thermal conductivity from the main body part to the heat exchange member is greatly changeable according to the structure of the connection part.

In particular, it has been confirmed that problems caused when heat is transferred to the heat exchange member are effectively solved in a case in which the thickness of the connection part is greater than the thickness of the main body part as previously described.

In a preferred example, the connection part of each of the heat dissipation members may have a thickness equivalent to 1.2 to 8.0 times the thickness of the main body part of each of the heat dissipation members. If the thickness difference is less than the above-defined range, it is difficult to achieve a desired effect. If the thickness difference is greater than the above-defined range, on the other hand, design of the batter module is considerably restricted, and the increase of thermal conductivity according to the increase of thickness is not remarkable. The connection part of each of the heat dissipation members may have a thickness equivalent to preferably 1.2 to 5.0 times, more preferably 1.2 to 3.5 times, the thickness of the main body part of each of the heat dissipation members.

In various structures, the thickness of the connection part may be greater than the thickness of the main body part.

As an example, the connection part of each of the heat dissipation members may be configured in a structure in which a thickness of the connection part at the main body part side thereof is equal to the thickness of the connection part at the top part side thereof while the connection part of each of the heat dissipation members has the above-defined thickness range.

As another example, the connection part of each of the heat dissipation members may be configured in a structure in which the connection part has am increasing thickness from the main body part side thereof to the top part side thereof. For example, the connection part of each of the heat dissipation members may be configured in, but is not limited to, a symmetrical arch structure in vertical section.

Of course, a relationship in thickness between the connection part and the main body part is not limited to the above examples.

Meanwhile, the heat dissipation member may be mounted at the tops of the heat dissipation members in various manners, such as welding or mechanical coupling.

Preferably, the heat exchange member has at least one coolant channel through which a coolant flows. For example, coolant channels, through which a liquid coolant, such as water, flows, may be formed in the heat exchange member, thereby achieving an excellent cooling effect with high reliability as compared with a conventional air cooling type cooling structure.

Specifically, the heat exchange member may be configured in a structure including a bottom part, at the bottom surface of which heat dissipation members are disposed in a tight contact manner, opposite side parts connected to the bottom part, the opposite side parts having coolant channels formed therethrough in the longitudinal direction, and a plurality of heat dissipation fins disposed between the opposite side parts so that the heat dissipation fins extend upward from the bottom part.

Consequently, heat transferred from the battery cells to the heat dissipation members is conducted to the bottom surface of the bottom part of the heat exchange member and is transferred to the coolant flowing through the coolant channels formed in the opposite side parts of the heat exchange member, i.e. in a water cooling fashion, and to the heat dissipation fins of the heat exchange member, i.e. in an air cooling fashion, thereby effectively achieving the dissipation of heat from the battery cells.

The structure of the heat exchange member is not particularly restricted so long as the heat exchange member is mounted at one side of the battery cell stack to easily remove heat generated from the battery cells. Preferably, the heat exchange member is mounted at the top of the module case.

According to circumstances, the module case may be provided at the top thereof with a depression part having a size sufficient to receive the heat exchange member, and the heat exchange member mounted in the depression part may have a height equal to or less than a height of the top of the module case. In this structure, even in a case in which a plurality of battery modules are stacked in the direction in which the heat exchange member is mounted, there is no difficulty in stacking the battery modules due to heat exchange member, and therefore, the above structure may be preferable in manufacturing a middle or large-sized battery pack having high power and large capacity.

In a preferred example, each of the battery cells may be a lightweight pouch-shaped battery including an electrode assembly mounted in a battery case formed of a laminate sheet including an inner resin layer which is thermally weldable, an isolation metal layer, and an outer resin layer exhibiting excellent durability.

Each of the battery cells may be mounted in a battery cartridge configured, for example, in a frame structure. This structure is preferably applied to a battery having sealing portions formed at the edge of the battery by thermal welding.

In the above structure, the battery cartridge includes at least one pair of plate-shaped frames to fix the edge of a corresponding one of the battery cells in a state in which at least one major surface of the corresponding one of the battery cells is exposed, and each of the frames are provided at the outside thereof with elastic pressing members to fix a corresponding one of the heat dissipation members to the exposed major surface of the corresponding one of the battery cells in a tight contact manner.

Therefore, in a case in which a plurality of battery cartridges, in which battery cells are mounted, are stacked, and heat dissipation members are disposed between the respective battery cartridges, the elastic pressing members provided at the outsides of the frames increase structural stability of the battery cartridge stack and enable the heat dissipation members to be effectively fixed to the battery cartridge stack.

Since each of the battery cartridges includes at least one pair of plate-shaped frames, not only one battery cell but also two or more battery cells may be mounted in each of the battery cartridges. For example, in a structure in which two battery cells are mounted in each of the battery cartridges, a middle frame is provided between the battery cells such that one of the battery cells is disposed between the upper frame and the middle frame, and the other battery cell is disposed between the middle frame and the lower frame. Even in this structure, the heat dissipation members are disposed at the outsides of the respective battery cells in a tight contact manner, and therefore, it is possible to provide a heat dissipation effect through thermal conduction.

The structure of the elastic pressing members is not particularly restricted so long as the elastic pressing members are mounted to the frames to fix the heat dissipation members upon assembling the battery module. For example, the elastic pressing members may be provided at upper and lower ends and/or left and right sides of the frames.

Consequently, the heat dissipation members are effectively pressed against the frames by the elastic pressing members mounted to the outsides of the frames in a tight contact manner to increase a degree to which the heat dissipation members are fixed to the frames with the result that it is not necessary to use an additional member to fix the heat dissipation members.

According to circumstances, the elastic pressing members may be further mounted at the insides of the frames which are in contact with the sealing portions of the battery cells.

In a preferred example, each of the battery cells may be mounted between the frames in a state in which the exposed major surface of each of the battery cells protrudes outward from a corresponding one of the frames, and the elastic pressing members may be provided at the outsides of the frames in a state in which the elastic pressing members have a greater height than a protruding height of each of the battery cells at the exposed major surface thereof.

That is, the frames formed lower than the height of the battery cells fix only the edges of the battery cells, and therefore, it is possible to achieve effective heat dissipation through the protruding exposed major surfaces of the battery cells. Also, upon application of the heat dissipation members, the elastic pressing members mounted higher than the height of the battery cells at the protruding exposed major surfaces of the battery cells effectively press the heat dissipation members to the exposed major surfaces of the battery cells in a tight contact manner, and therefore, it is possible to increase overall mechanical strength of a battery module without increasing the size of the battery module using the heat dissipation members.

The material for the elastic pressing members mounted at the outsides of the frames is not particularly restricted so long as the elastic pressing members exhibit high elastic pressing force when the elastic pressing members are pressed. Preferably, each of the elastic pressing members is formed of an elastic polymer resin. Such a polymer resin may be a material that is capable of exhibiting high elastic force or may have a structure or shape that is capable of exhibiting high elastic force. A representative example of the former may be rubber, and a representative example of the latter may be foamed polymer resin.

The elastic pressing members may be mounted to the frames in various manners. In order to more efficiently mount the elastic pressing members to the frames, the frames may be provided at the outsides thereof with grooves, in which the elastic pressing members may be mounted.

Each of the elastic pressing members may have a width equivalent to 10% or more of the width of each of the frames. If the width of each of the elastic pressing members is too small as compared with the width of each of the frames, an effect obtained by mounting the elastic pressing members to the frames may not be exhibited. On the other hand, if the width of each of the elastic pressing members is too large as compared with the width of each of the frames, the elastic pressing members, which are elastically deformed when the elastic pressing members are pressed, cover large portions of the heat dissipation members with the result that a heat dissipation effect may be lowered. Furthermore, the elastic pressing members may protrude out of the frames when the elastic pressing members are pressed, which is not preferable. Of course, therefore, the width of each of the elastic pressing members may exceed the above defined range unless the above problems are caused.

Meanwhile, a middle or large-sized battery pack uses a plurality of battery cells in order to provide high power and large capacity. In battery modules constituting such a battery pack, higher heat dissipation efficiency is needed to secure safety of the battery pack.

In accordance with another aspect of the present invention, therefore, there is provided a middle or large-sized battery pack manufactured by combining two or more battery modules based on desired power and capacity.

The battery pack according to the present invention includes a plurality of battery cells in order to provide high power and large capacity. Consequently, the battery pack according to the present invention is preferably used as a power source for electric vehicles, hybrid electric vehicles, or plug-in hybrid electric vehicles in which high-temperature heat generated during the charge and discharge of the battery cells is a serious safety concern.

In particular for the electric vehicles and plug-in hybrid electric vehicles, which require high power from the battery pack for a long period of time, a high heat dissipation property is needed. In this aspect, the battery pack according to the present invention is more preferably used in the electric vehicles and the plug-in hybrid electric vehicles.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
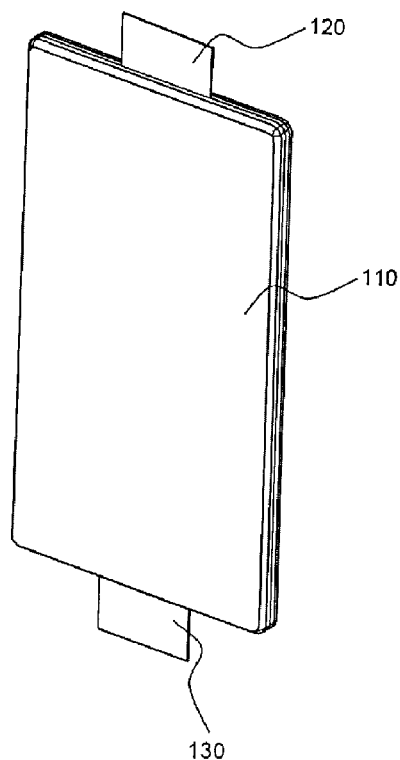
FIG. 1 is a typical view illustrating a plate-shaped battery cell.

FIG. 1 is a typical view illustrating a plate-shaped battery cell.

Referring to FIG. 1, a plate-shaped battery cell 100 includes an electrode assembly (not shown) of a cathode/separator/anode structure mounted in a battery case 110 formed of a laminate sheet including a resin layer and a metal layer. A cathode terminal 120 and an anode terminal 130, electrically connected to the electrode assembly, protrude outward from the upper end and the lower end of the battery case 110, respectively. For simplicity of illustration, a sealing portion formed at the edge of the battery case 110 by thermal welding is not shown.

Since the battery case 110 includes the resin layer, dissipation of heat from the battery cell is not easy as compared with a metal case. In particular, in a battery module including a plurality of stacked battery cells 100, performance and safety of the battery module may be deteriorated due to low heat dissipation.

Figure 2:
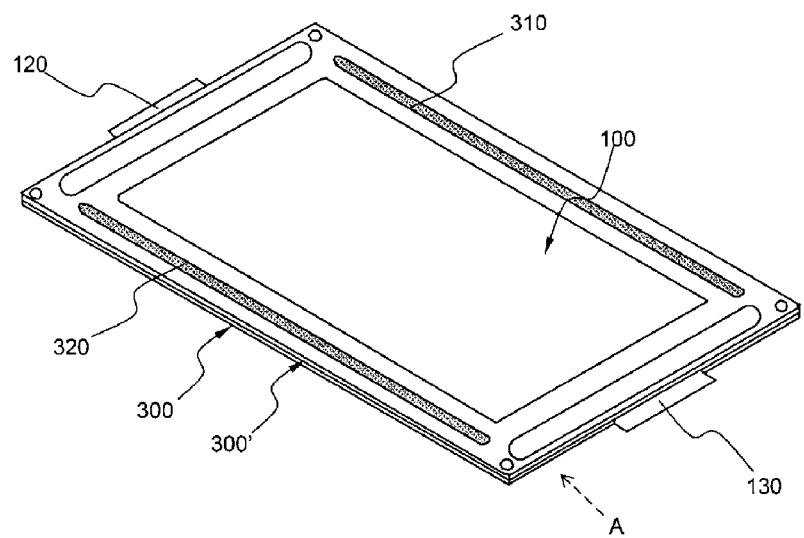
FIG. 2 is a typical plan view illustrating a battery cartridge.
Figure 3:
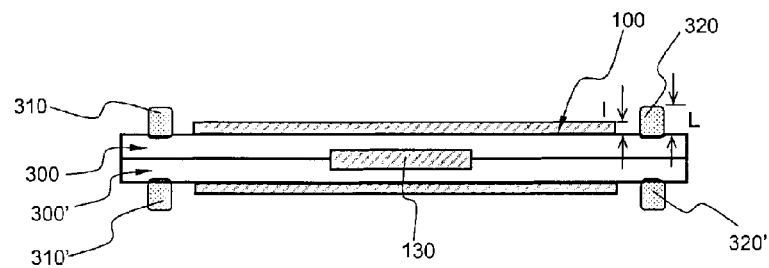
FIG. 3 is a vertical sectional view illustrating the battery cartridge of FIG. 2 when viewed in a direction A.

FIG. 2 is a typical plan view illustrating a battery cartridge according to an embodiment of the present invention, and FIG. 3 is a vertical sectional view typically illustrating the battery cartridge of FIG. 2 when viewed in a direction A.

Referring to these drawings, a battery cartridge 200 is configured in a structure in which a plate-shaped battery cell 100 is mounted in the battery cartridge 200, and electrode terminals 120 and 130 of the battery cell 100 protrude outward from the battery cartridge 200.

The battery cartridge 200 includes a pair of plate-shaped frames 300 and 300' configured to fix opposite sides (for example, sealing portions) of the battery cell 100 at the edge thereof in a state in which opposite major surfaces of the battery cell 100 are exposed.

The respective frames 300 and 300' are provided at left and right side parts of the outsides thereof with elastic pressing members 310, 320, 310' and 320', which extend in parallel in the longitudinal direction of the respective frames 300 and 300'.

Also, the battery cell 100 is mounted between the respective frames 300 and 300' in a state in which the exposed major surfaces of the battery cell 100 protrude from the respective frames 300 and 300'. The elastic pressing members 310, 320, 310' and 320' are mounted at the outsides of the respective frames 300 and 300' in a state in which the elastic pressing members 310, 320, 310' and 320' have a height L greater than a protruding height 1 of the battery cell 100 at the exposed major surfaces thereof. Upon application of heat dissipation members (not shown), therefore, it is possible for the elastic pressing members 310, 320, 310' and 320' to provide elastic pressing force with respect to the heat dissipation members (not shown). Also, the applied heat dissipation members (not shown) are effectively pressed to the exposed major surfaces of the battery cell 100 in a tight contact manner by the elastic pressing members 310, 320, 310' and 320', and therefore, it is possible to achieve effective heat dissipation without increasing the size of a battery module using the heat dissipation members.

Figure 4:
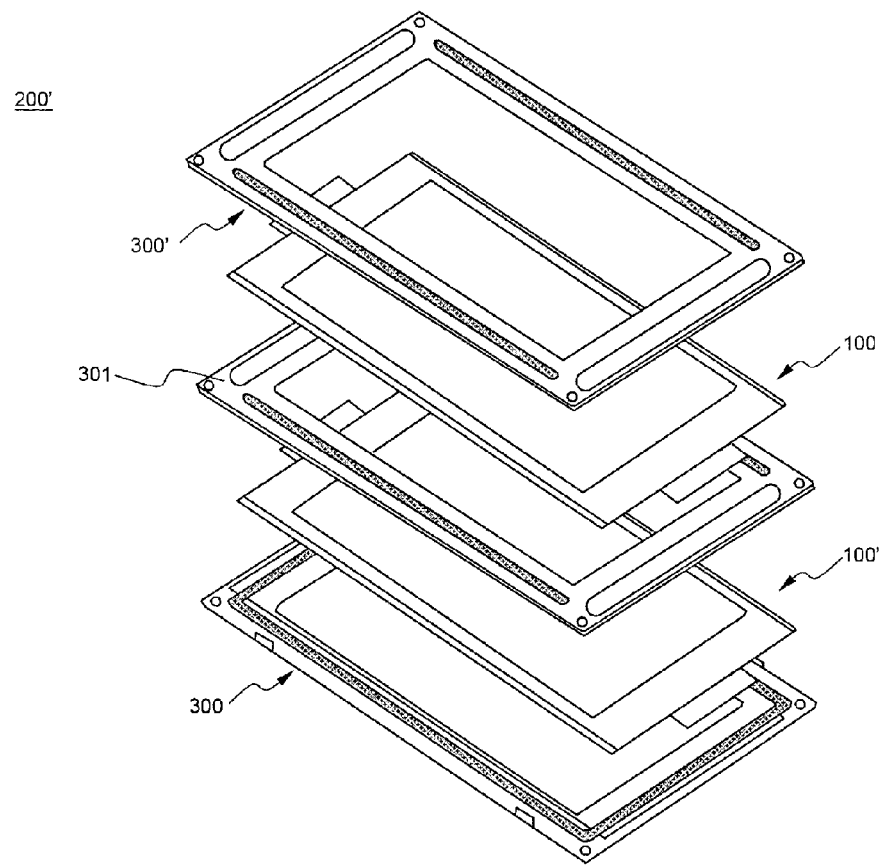
FIG. 4 is an exploded view illustrating a battery cartridge including two battery cells.
Figure 5:
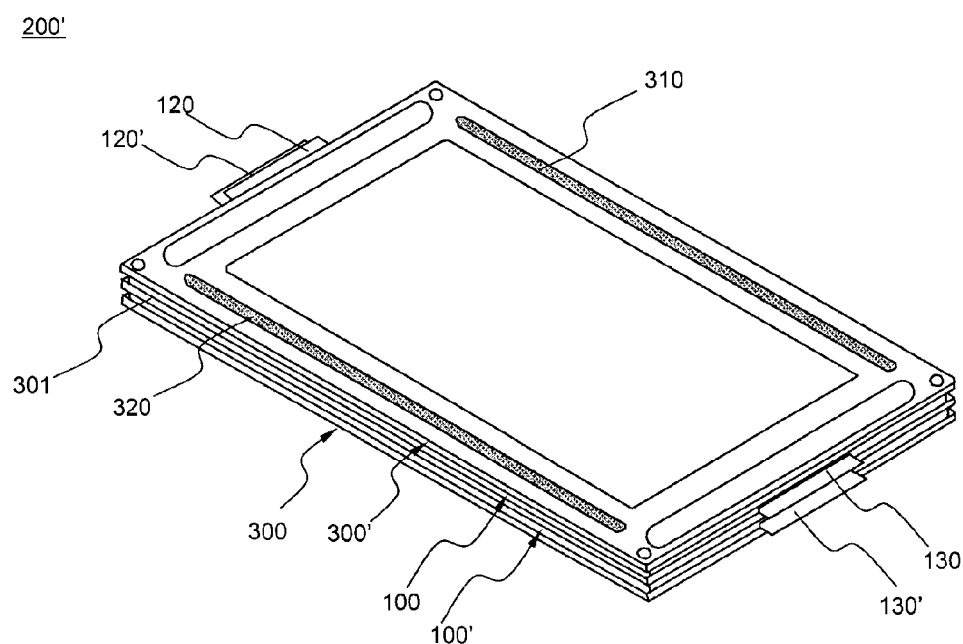
FIG. 5 is a typical plan view illustrating the battery cartridge of FIG. 4.

FIG. 4 is an exploded view typically illustrating a battery cartridge including two battery cells, and FIG. 5 is a typical plan view illustrating the battery cartridge of FIG. 4.

Referring to these drawings, a battery cartridge 200' is identical to the battery cartridge of FIG. 4 except that two plate-shaped battery cells 100 and 100' are mounted in the battery cartridge 200' in a stacked state, and a middle frame 301 is further provided between the battery cells 100 and 100', and therefore, a detailed description thereof will not be given.

In this structure, it is possible to achieve an excellent heat dissipation effect through thermal conduction even in a case in which heat dissipation members (not shown) are provided at the major surfaces of the battery cells 100 and 100'. As compared with the structure of FIG. 2, therefore, the heat dissipation members are pressed to the major surfaces of the battery cells 100 and 100' in a tight contact manner by elastic pressing members 310 and 320 provided at a pair of frames 300 and 300' and the middle frame 301, and therefore, it is possible to achieve effective heat dissipation while minimizing the increase in size of a battery module.

Figure 6:
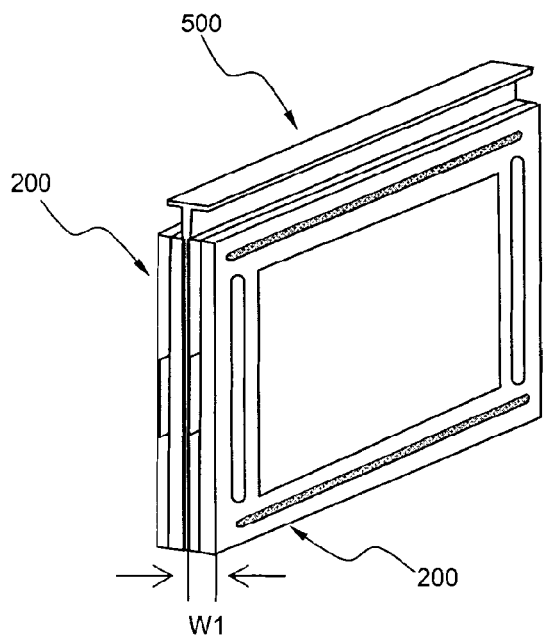
FIG. 6 is a perspective view illustrating a battery module in which a heat dissipation member is disposed between battery cartridges, one of which is shown in FIG. 2.
Figure 7:
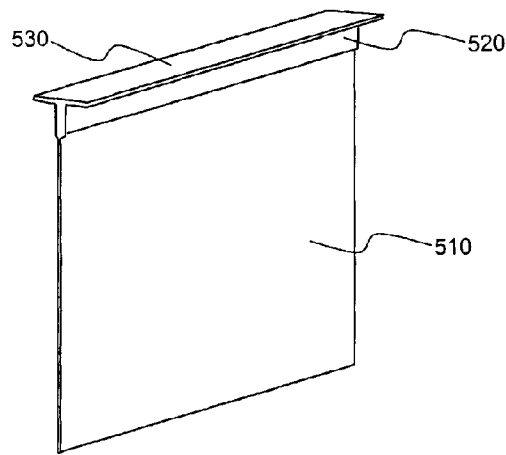
FIG. 7 is a typical view illustrating a heat dissipation member of FIG. 6.
Figure 8:
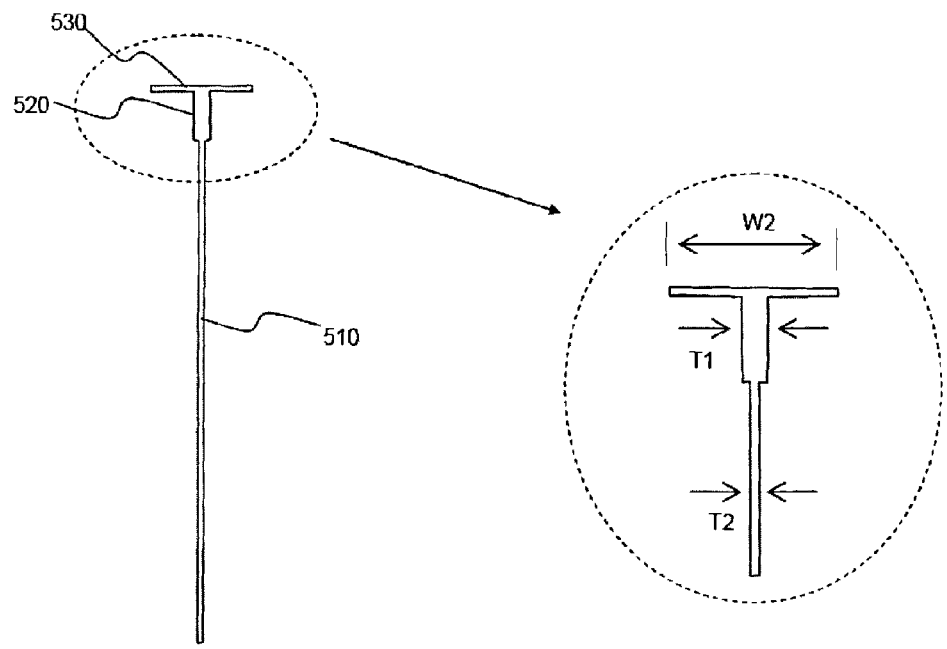
FIG. 8 is a front view illustrating the heat dissipation member of FIG. 7 including a partially enlarged view of the heat dissipation member.

FIG. 6 is a perspective view illustrating a battery module in which a heat dissipation member is disposed between battery cartridges, one of which is shown in FIG. 2, FIG. 7 is a typical view illustrating a heat dissipation member of FIG. 6, and FIG. 8 is a front view illustrating the heat dissipation member of FIG. 7 including a partially enlarged view of the heat dissipation member.

Referring to these drawings, a heat dissipation member 500 is disposed between two battery cartridges 200.

The heat dissipation member 500 is formed of a metal sheet exhibiting high thermal conductivity. The heat dissipation member 5 includes a main body part 510 disposed at the interface between the battery cartridges 200, a connection part 520 connected to the main body part 510 in a state in which the connection part 520 is exposed outward from the stacked cartridges 200, and a top part 530 perpendicularly extending from the connection part 520 in opposite directions so that the top part 530 contacts a heat exchange member (not shown).

The thickness T1 of the connection part 520 is greater than the thickness T2 of the main body part 510. The main body part 510 has a size equivalent to approximately 100% of the area of one major surface of each of the cartridges 200. Also, the width W2 of the top part 520 is approximately equal to the width W1 of each of the cartridges 200. Alternatively, the width W2 of the top part 520 may be less than the width W1 of each of the cartridges 200.

As described above, the heat dissipation member is designed so as to exhibit the optimum heat dissipation efficiency, thereby improving cooling efficiency of the battery module.

Figure 9:
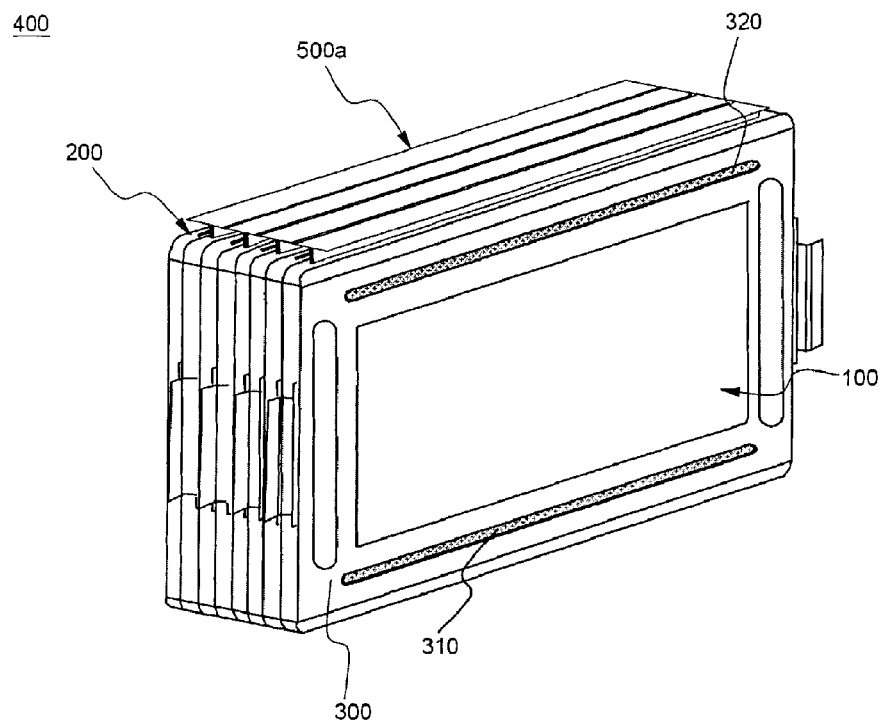
FIG. 9 is a typical view illustrating a battery module including a plurality of battery cartridges, two of which are shown in FIG. 6.

FIG. 9 is a perspective view typically illustrating a battery module configured in a structure in which heat dissipation members are disposed between battery cartridges, two of which are shown in FIG. 6.

Referring to FIG. 9 together with FIG. 6, a battery module 400 includes eight battery cartridges 200, which are sequentially stacked, and four heat dissipation members 500 are disposed at some interfaces between the battery cartridges 200 so that heat generated from the battery cartridges 200 (specifically, heat generated from the battery cells mounted in the respective battery cartridges) is conducted to the heat dissipation members 500 so as to achieve a high heat dissipation effect.

Elastic pressing members 310 and 320 provided at the outsides of the frames 300 of the eight battery cartridges 200 assist the heat dissipation members 500 to be stably mounted and fixed to the frames 300.

Consequently, heat generated from battery cells 100 during the charge and discharge of the battery cells 100 is transferred to the heat dissipation members 500 disposed between the respective battery cartridges 200 and is then discharged to the outside through a heat exchange member (not shown), thereby achieving high heat dissipation efficiency while the battery module is configured in a compact structure.

Figure 10:
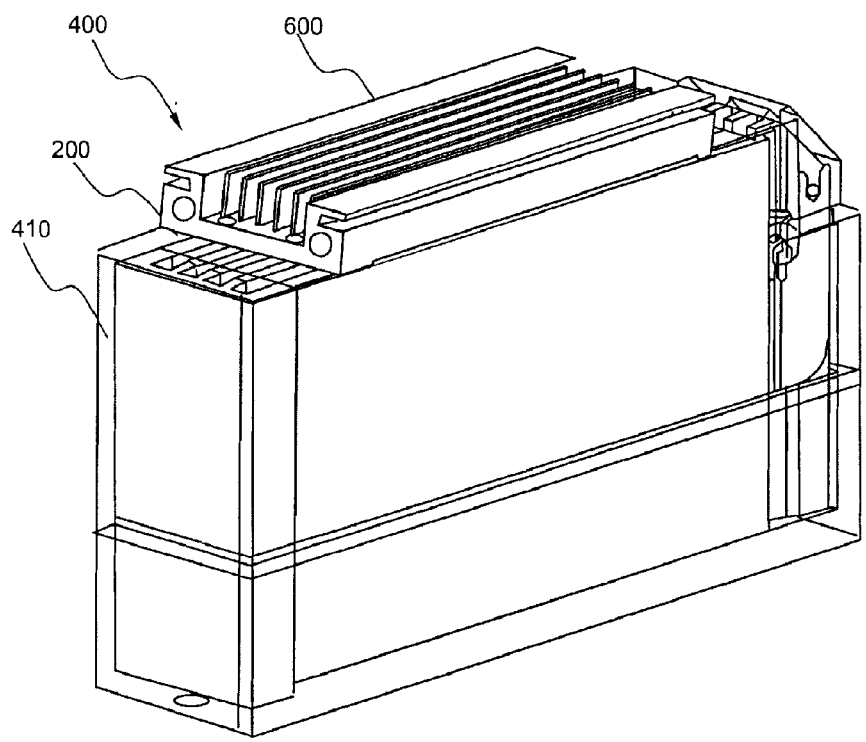
FIG. 10 is a typical view illustrating a battery module according to an embodiment of the present invention, to one side of which a heat exchange member is mounted.
Figure 11:
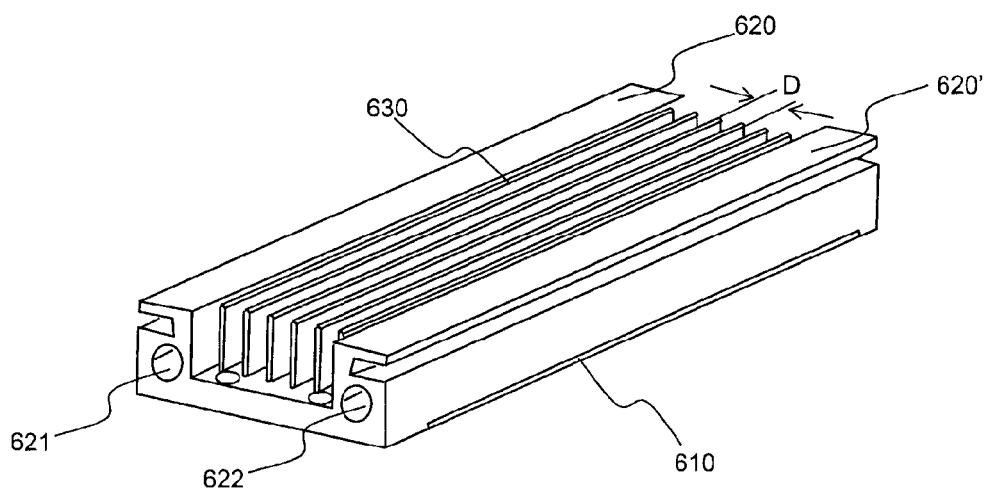
FIG. 11 is a typical enlarged view illustrating the heat exchange member of FIG. 10.

FIG. 10 is a typical view illustrating a battery module according to an embodiment of the present invention, to one side of which a heat exchange member is mounted, and FIG. 11 is a typical view illustrating the heat exchange member of FIG. 10.

Referring to these drawings together with FIG. 9, a battery module 400 mounted in a module case 410 is configured in a structure in which a heat exchange member 600 is mounted at the top of a battery cartridge stack constituted by sequentially stacking a plurality of battery cartridges 200.

The heat exchange member 600 includes a bottom part 610 mounted at the top of the module case 410 so that heat dissipation members 500a are disposed at the bottom surface of the bottom part 610 in a tight contact manner, opposite side parts 620 and 620' connected to the bottom part 610, the opposite side parts 620 and 620' having coolant channels 621 and 622 formed therethrough in the longitudinal direction, and a plurality of heat dissipation fins 630 disposed between the opposite side parts 620 and 620' so that the heat dissipation fins 630 extend upward from the bottom part 610.

That is, a coolant, such as water, flows through the coolant channels 621 and 622, and the heat dissipation fins 630 are arranged at predetermined intervals D so that air flows between the respective heat dissipation fins 630. Consequently, heat transferred from the heat dissipation members 500a is effectively removed with high reliability and excellent cooling efficiency.

Hereinafter, excellence of the heat dissipation member according to the present invention will be described in more detail based on an example of the present invention. It should be noted, however, that the scope of the present invention is not limited by the illustrated example.

EXAMPLE 1

A battery module was manufactured as follows.

1-1 Manufacture of Battery Cell

An electrode assembly of a cathode/separator/anode structure was mounted in a battery case formed of a laminate sheet including a resin layer and a metal layer to manufacture a plate-shaped battery cell.

1-2 Manufacture of Heat Dissipation Member

A main body part and a top part were formed as shown in FIG. 7 using an aluminum sheet having a thickness of 0.1 mm, and a heat dissipation member was manufactured so that the main body part had a size equal to one major surface of the battery cell and a connection part had a thickness of 0.2 mm.

1-3 Manufacture of Battery Module Including Heat Dissipation Member

A heat dissipation member manufactured as described in Section 1-2 was disposed at an interface between two battery cells manufactured as described in Section 1-1 as shown in FIG. 6 to manufacture a battery module.

COMPARATIVE EXAMPLE 1

A battery module was manufactured in the same manner as Example 1 except that the thickness of the connection part was 0.1 mm, which was equal to the thickness of the main body part, when manufacturing the heat dissipation member.

EXPERIMENTAL EXAMPLE 1

A battery module manufactured according to Example 1 and a battery module manufactured according to Comparative example 1 were prepared, and the change in temperature of the battery module based on heat generated from the battery cells of the respective battery module was measured. The results were indicated in FIGS. 12, 13 and 14 (a graph). This experiment was carried out in a condition in which heat is generated from the battery module including the heat dissipation member at room temperature for 5 minutes.

Figure 12:
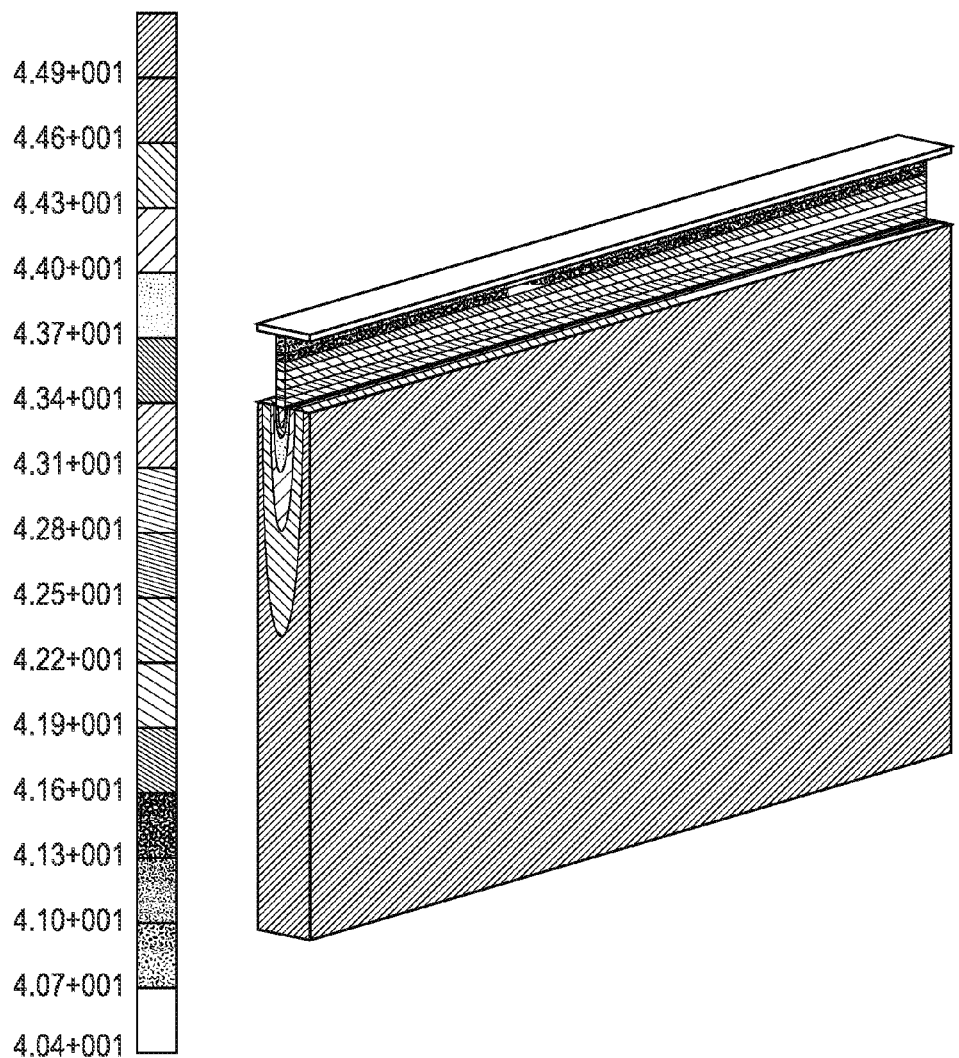
FIGS. 12 to 14 are views and a graph illustrating the result of a heat generation experiment according to Experimental example 1 carried out with respect to a battery module manufactured according to Example 1 and a battery module manufactured according to Comparative example 1.

As can be seen from FIG. 12, the heat dissipation member was shown in a blue color in the temperature change experiment carried out with respect to the battery module of Example 1 according to the present invention. In particular, the upper parts of the battery cells adjacent to the connection part of the heat dissipation member had lower temperature than the lower parts of the battery cells. For reference, a blue color indicates low temperature while a red color indicates high temperature.

Figure 13:
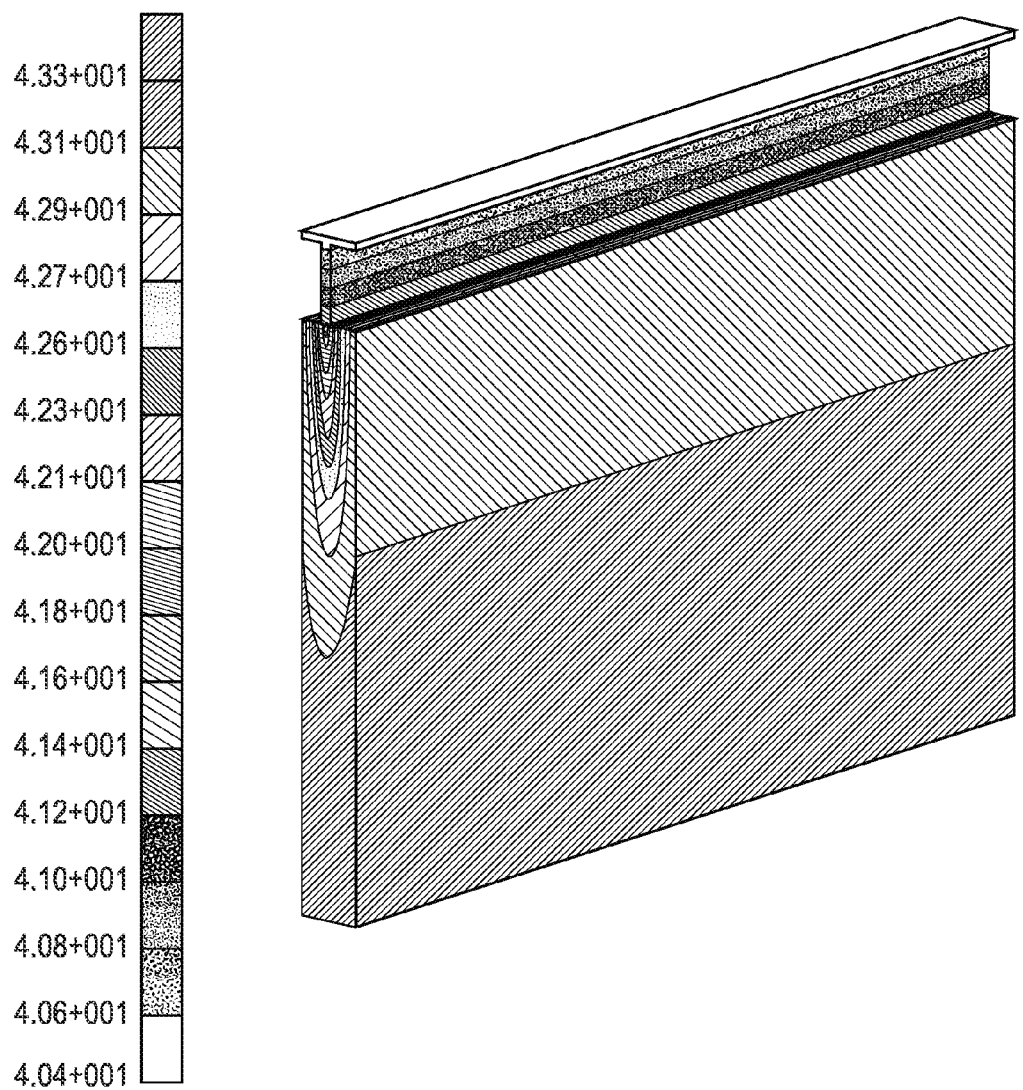

That is, heat generated from the battery cells was reduced when the thickness of the connection part of the heat dissipation member was large. On the other hand, it was confirmed that a major portion of each of the battery cells of the battery module of Comparative example 1 was shown in a red color as shown in FIG. 13. That is, the temperature of the battery cells was high.

Figure 14:
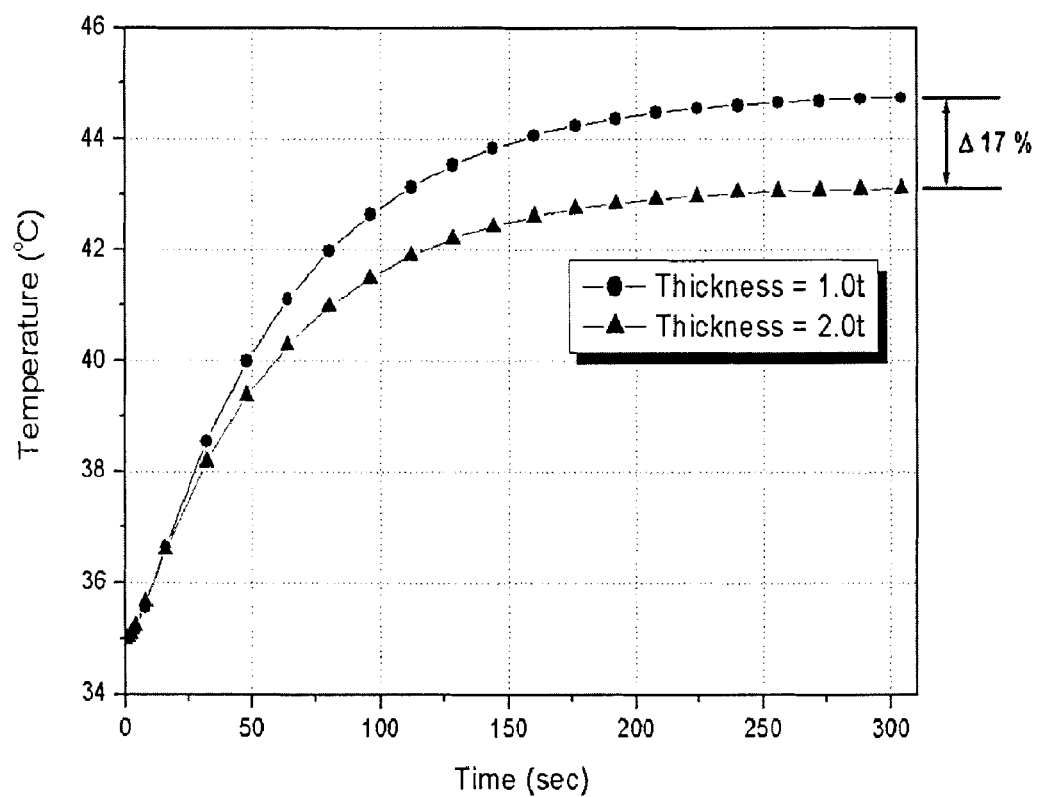

Concretely, as can be seen from a graph of FIG. 14, the maximum temperature of the battery module of Example 1 according to the present invention was approximately 43☐ and the maximum temperature of the battery module of Comparative example 1 was approximately 45☐. That is, the maximum temperature distance between the battery module of Example 1 and the battery module of Comparative example 1 was approximately 17%.

In the battery module of Example 1, therefore, temperature distribution before the maximum temperature was relatively low with the result that the overall temperature to which the battery cells, sensitive to temperature, were exposed was also reduced, thereby increasing the life span of the battery cells.

As a result, the battery module according to the present invention may include a heat dissipation member that is optimized by adjusting design parameters based on heat generation properties of the battery cells.

INDUSTRIAL APPLICABILITY

As is apparent from the above description, the battery module according to the present invention is configured in a structure in which a heat dissipation member to accelerate the dissipation of heat from battery cells is disposed at an interface between the battery cells, and a heat exchange member, exhibiting high thermal conductivity, integrally connected to the heat dissipation member is mounted at one side of the battery cell stack. Consequently, it is possible to effectively discharge heat generated from the battery cells to the outside while minimizing the increase in size of the battery module.

Also, a water cooling type cooling structure is formed in the heat exchange member, and therefore, it is possible to further improve the dissipation of heat from the battery cells with high reliability. The internal temperature of the battery cells is uniformly controlled based on such high heat dissipation efficiency, thereby considerably improving lift span and safety of the battery cells.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery module comprising:
   a module case;
   a plurality of plate-shaped battery cells mounted in a stacked state in the module case; each of the plate-shaped battery cells comprising an electrode assembly mounted in a battery case formed of a laminate sheet,
   a plurality of heat dissipation members, each heat dissipation member disposed at an interface between battery cells; and
   a heat exchange member mounted at one side of the battery cell stack, the heat exchange member interconnecting the heat dissipation members,
   wherein heat generated from the battery cells during charge and discharge of the battery cells is removed by the heat exchange member via the heat dissipation members, and
   wherein each of the heat dissipation members comprises:
   a main body part disposed at the interface between the corresponding battery cells;
   a connection part connected to the main body part in a state in which the connection part is exposed outward from the stacked battery cells, the connection part having a greater thickness than the main body part; and
   a top part perpendicularly extending from the connection part in opposite directions so that the top part contacts the heat exchange member.

2. The battery module according to claim 1, wherein each of the heat dissipation members is formed of a thermally conductive material.

3. The battery module according to claim 1, wherein the heat exchange member is formed of a thermally conductive material.

4. The battery module according to claim 2, wherein each of the heat dissipation members is formed of a metal sheet.

5. The battery module according to claim 3, wherein the heat exchange member is formed of a metal sheet.

6. The battery module according to claim 1, wherein the main body part of each of the heat dissipation members has a size equivalent to 70 to 120% of an area of one major surface of each of the battery cells.

7. The battery module according to claim 1, wherein the connection part of each of the heat dissipation members has a thickness equivalent to 1.2 to 8.0 times the thickness of the main body part of each of the heat dissipation members.

8. The battery module according to claim 1, wherein the connection part of each of the heat dissipation members has a thickness of the connection part at the main body part side thereof equal to the thickness at the top part side thereof.

9. The battery module according to claim 1, wherein the connection part of each of the heat dissipation members has an increasing thickness from the main body part side thereof to the top part side thereof.

10. The battery module according to claim 9, wherein the connection part of each of the heat dissipation members is configured in a symmetrical arch structure in vertical section.

11. The battery module according to claim 1, wherein the heat exchange member has at least one coolant channel through which a coolant flows.

12. The battery module according to claim 11, wherein the heat exchange member comprises:
a bottom part disposed at tops of the heat dissipation members;
opposed side parts connected to the bottom part, the opposed side parts having coolant channels formed therethrough in a longitudinal direction; and
a plurality of heat dissipation fins disposed between the opposed side parts so that the heat dissipation fins extend upward from the bottom part.

13. The battery module according to claim 1, wherein the heat exchange member is mounted at a top of the module case.

14. The battery module according to claim 1, wherein a top of the module case is provided with a depression part having a size sufficient to receive the heat exchange member, and
wherein the heat exchange member mounted in the depression part has a height equal to or less than a height of the top of the module case.

15. The battery module according to claim 1, wherein the laminate sheet comprises an inner resin layer which is thermally weldable, an isolation metal layer, and an outer resin layer.

16. The battery module according to claim 1, wherein at least one of the battery cells is mounted in a battery cartridge configured in a frame structure.

17. The battery module according to claim 16, wherein the battery cartridge comprises at least one pair of plate-shaped frames to fix an edge of at least one of the battery cells so that at least one major surface of the at least one of the battery cells is exposed, and
wherein each of the frames is provided at an outside thereof with elastic pressing members to fix a corresponding one of the heat dissipation members to the exposed major surface of the at least one of the battery cells.

18. The battery module according to claim 17, wherein the elastic pressing members are provided at upper and lower ends and/or left and right sides of each of the frames.

19. The battery module according to claim 17, wherein each of the battery cells is mounted between the corresponding frames so that the exposed major surface of each of the battery cells protrudes outward from a corresponding one of the frames, and
wherein the elastic pressing members are provided at the outside of each of the frames so that the elastic pressing members have a greater height than a protruding height of each of the battery cells at the exposed major surface thereof.

20. The battery module according to claim 17, wherein each of the elastic pressing members is formed of a polymer resin exhibiting elastic pressing force when each of the elastic pressing members is pressed.

21. The battery module according to claim 17, wherein each of the frames is provided at the outside thereof with grooves, in which the elastic pressing members are mounted.

22. A middle or large-sized battery pack comprising two or more battery modules according to claim 1, the number of the battery modules being set based on power and capacity of the battery pack.

* * * * *